United States Patent
Smith et al.

(10) Patent No.: US 7,472,389 B2
(45) Date of Patent: Dec. 30, 2008

(54) STOCHASTICALLY BASED THREAD BUDGET OVERRUN HANDLING SYSTEM AND METHOD

(75) Inventors: Joseph A. Smith, Phoenix, AZ (US); Ryan L. Roffelsen, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 825 days.

(21) Appl. No.: 10/696,122

(22) Filed: Oct. 29, 2003

(65) Prior Publication Data

US 2005/0097553 A1 May 5, 2005

(51) Int. Cl.
*G06F 9/46* (2006.01)
(52) U.S. Cl. ........................................ 718/102
(58) Field of Classification Search ................. 718/102
See application file for complete search history.

(56) References Cited

U.S. PATENT DOCUMENTS

| 5,628,013 | A * | 5/1997 | Anderson et al. ........... 718/107 |
| 6,754,690 | B2 * | 6/2004 | Larson ........................ 718/102 |
| 2002/0138542 | A1 * | 9/2002 | Bollella et al. .............. 709/102 |
| 2002/0198925 | A1 * | 12/2002 | Smith et al. ................. 709/104 |
| 2003/0069917 | A1 | 4/2003 | Miller |

FOREIGN PATENT DOCUMENTS

WO WO02/054238 A 7/2002

OTHER PUBLICATIONS

PCT International Search Report: PCT/US2004/035835, Applicant Reference No. H0004434-5509, Oct. 7, 2005, EP International Search Authority, 6 pages.

* cited by examiner

*Primary Examiner*—Li B. Zhen
*Assistant Examiner*—Mengyao Zhe
(74) *Attorney, Agent, or Firm*—McDonnell Boehnen Hulbert & Berghoff LLP

(57) ABSTRACT

A system and method are provided for apportioning additional thread activation time to computer application threads that experience activation time budget overruns. A variable is set to a predetermined system pad time value, and an application thread is activated for an actual activation time. The application thread's actual activation time is compared with its activation time budget. If the actual thread activation time exceeds the thread activation time budget, the system pad time value is adjusted to thereby obtain an updated pad time value. By providing a system pad time that application threads may draw from, the pad time allotted to individual application threads may be reduced when compared to a worst-case scenario.

37 Claims, 3 Drawing Sheets

STOCHASTICALLY BASED THREAD BUDGET OVERRUN HANDLING SYSTEM AND METHOD

FIELD OF THE INVENTION

The present invention generally relates to real-time computer operating systems and, more particularly, to time-partitioned, real-time computer operating systems which schedule and execute multi-threaded applications.

BACKGROUND OF THE INVENTION

Real-time computer operating systems can be configured to supervise and execute multiple application threads concurrently. These operating systems permit the programming code to be organized such that, conceptually, these multiple application threads are being executed simultaneously. In reality, however, the operating system is switching between each of the threads, in accordance with a programmed schedule.

In addition, some real-time computer systems may be configured to provide both space partitioning and time partitioning. Partitioning refers generally to separation of resources used by various application threads in a system, such that the resources utilized by a one thread are protected from corruption or usurping by another thread. Space partitioning refers to the protection of resources such as, for example, memory and I/O devices. Time partitioning refers to assurance that a given thread will have access to a predetermined amount of CPU time, regardless of the attempted behavior of any other thread.

One example of a real-time system that may be both space and time-partitioned, is an aircraft avionics system. An avionics system may include application threads that are used to monitor and control functions of varying criticality, and that may execute using the same processing assets, such as a single central processing unit (CPU) or the same memory (or portions of memory). Thus, the application schedule allocates CPU time to each of the various application threads, and ensures that the application threads used to monitor and/or control less critical functions do not prevent application threads used to monitor and/or control higher criticality functions from executing in a timely manner.

The application schedule allocates CPU time based on a budgeted time and a rate for each application thread. More particularly, each application thread has a particular activation time budget and activation period. An application thread may be repeatedly activated at its particular activation period, and for its particular amount of budgeted activation time during each activation period. For example, a first application thread may have a budgeted activation time of 3 units of time and an activation period of 5 units of time, and a second application thread may have a budgeted activation time of 4 units of time and an activation period of 10 units of time (e.g., the first application thread has an activation frequency that is twice that of the second application thread). Thus, when each application thread is operating within its assigned budget, the first application thread may be activated for up to 3 units of time every 5 units of time, and the second application may be activated for up to 4 units of time every 10 units of time.

The activation time budget of each application thread typically includes at least an execution time and a pad time. The execution time is the amount of time needed for the application thread to perform its intended function. The pad time is included as part of the activation time budget to allow for instances in which an application thread may attempt to overrun its execution time budget. The magnitude of this pad time is determined based on postulated or measured worst-case response conditions, and is included in the activation budget of each application thread. Thus, the overall activation time budget for an application is the sum of the worst-case activation time budgets for each of the individual threads of the application.

Although the above-described method of handling application thread activation time budget overruns provides for some design conservatism, it may also result in overall system underutilization. This is because the magnitude of the pad time is fairly pessimistic compared to execution time overrun values actually experienced, and the overall activation time budget for each application is subtracted from the overall system utilization time pool.

Accordingly, there is a need for a system and method for handling application thread activation time budget overruns that increases system utilization capabilities as compared to present systems and methods. Furthermore, other desirable features and characteristics will become apparent from the subsequent detailed description and the appended claims, taken in conjunction with the accompanying drawings and this background section.

BRIEF SUMMARY OF THE INVENTION

In one embodiment, and by way of example only, a method of apportioning additional thread activation time to computer application threads that experience activation time budget overruns includes setting a variable to a predetermined system pad time value. An application thread is activated for an actual activation time. The application thread's actual activation time is compared with its activation time budget. If the actual thread activation time exceeds the thread activation time budget, the system pad time value is adjusted to thereby obtain an updated pad time value.

In another exemplary embodiment, a system for apportioning additional thread activation time to computer application threads that experience activation time budget overruns includes a memory and a processor. The memory is adapted to store at least a system pad time value therein. The processor is in operable communication with the memory and is operable to (i) activate one or more application threads for an actual activation time; (ii) compare the application thread's actual activation time with its activation time budget; and (iii) if the actual thread activation time exceeds the thread activation time budget, adjust the system pad time value to obtain an updated pad time value.

In yet another exemplary embodiment, a computer readable medium containing computer executable code for instructing a computer, which is configured to apportion additional thread activation time to computer application threads that experience activation time budget overruns, to perform the steps of setting a variable to a predetermined system pad time value. An application thread is activated for an actual activation time. The application thread's actual activation time is compared with its activation time budget. If the actual thread activation time exceeds the thread activation time budget, the system pad time value is adjusted to thereby obtain an updated pad time value.

BRIEF DESCRIPTION OF THE DRAWINGS

The present invention will hereinafter be described in conjunction with the following drawing figures, wherein like numerals denote like elements, and wherein.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
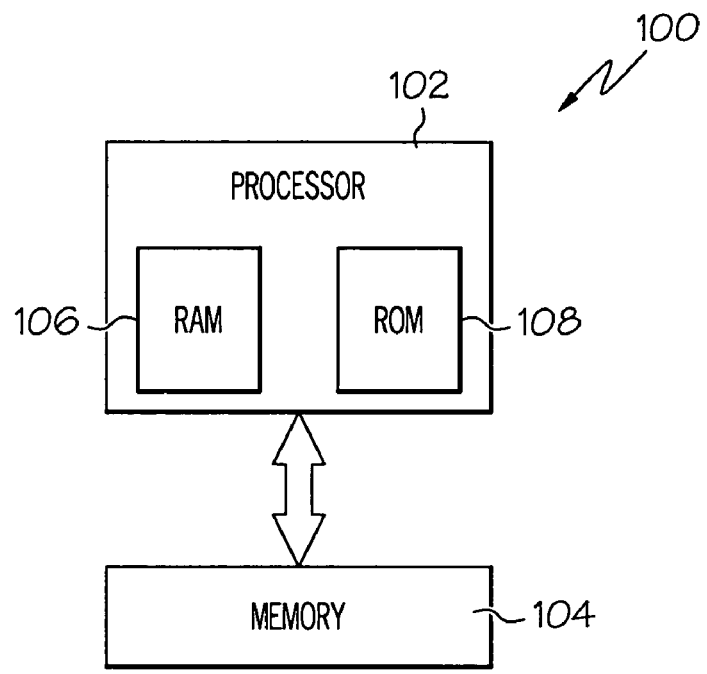
FIG. 1 is a functional block diagram of an exemplary system that may implement an embodiment of the present invention.

A functional block diagram of an exemplary system that may implement the present invention is illustrated in FIG. 1. The system 100, which may, for example, form part of an aircraft avionics system, includes a processor 102, and a memory 104 in communication with the processor 102. The processor 102 may include on-board RAM (random access memory) 106, and on-board ROM (read only memory) 108. The processor 102 may be any one of numerous known general purpose microprocessors or an application specific processor that operates in response to program instructions. Such program instructions may be stored in either or both the RAM 106 and the ROM 108. For example, the operating system software may be stored in the ROM 108, whereas various operating mode software routines and various operational parameters may be stored in the RAM 106. It will be appreciated that this is merely exemplary of one scheme for storing operating software and software routines, and that various other storage schemes may be implemented.

The memory 104, which is in communication with the processor 102 via any one of numerous known data communication bus protocols, may also be used to store some or all of the operating system software or software routines. The memory 104 may also be used to store one or more parameters and variables used by the operating system software and software routines. It will be appreciated that the memory 104 may be a separate circuit component, as it is depicted in FIG. 1, or it may be formed integrally with the processor 102 or some other component in the system 100 into which it is installed.

The operation of the system 100 is controlled, at least in part, by an operating system that implements time-partitioned, real-time system operation. To do so, the operating system, among other things, implements an application schedule that multiplexes access time to the processor 102 amongst multiple application threads based on each application thread's activation time budget and its rate (or period), which will now be discussed in more detail.

Figure 2:
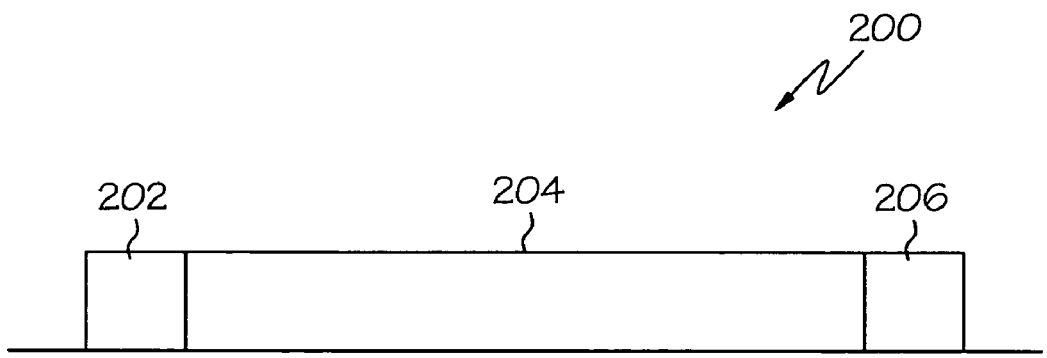
FIG. 2 is a diagram illustrating an exemplary activation time budget and its components.

As was previously noted, each application thread is assigned an activation time budget. An exemplary activation time budget 200 for a single application thread is illustrated in FIG. 2, and includes three major components, a context switch-in time 202, an execution time 204, and a pad time 206. The context switch-in time 202 is the time it takes for the operating system to make an application thread ready for execution. A detailed understanding of the context switch-in time 202 is not necessary to a complete understanding of the present invention. Therefore, it will not be further described.

The execution time 204, as its name connotes, is the time needed for an application thread to actually perform its intended function. The pad time 206 includes at least the amount of time it takes for the operating system to conduct an application thread context switch-out. However, it is noted that the pad time 206 may also include some pad time in addition to the context switch-out time. Nonetheless, its magnitude is less than what it would be if it were based on postulated worst-case response conditions. This is because the present embodiment of the operating system allows for a "system pad time," to be set aside. This system pad time, which is subtracted from the overall system time budget, is available to all the application threads executing on the system 100. Thus, the pad time 206 portion of each application thread's activation time budget 200 may be significantly reduced, as compared to postulated worst-case conditions. If an application thread does attempt to exceed its execution time 204, and its budgeted pad time 206 is insufficient to cover the time needed to complete the execution, the application thread may draw the needed time from the system pad time. It will be appreciated that an application thread may exceed its budgeted activation time for various reasons. For example, the system 100 may be in a critical section when the thread timer expires (e.g., at the end of 204), and/or the path through the operating system code that gets out of the current thread may take longer than expected due to, for example, cache effects. It will additionally be appreciated that each time an application thread draws time from the system pad time during a period, the amount of system pad time that other application threads that execute may draw from during the same period is reduced. A more detailed description of this particular process will now be described in more detail. In doing so, reference should be made to FIGS. 3-5 in combination, which are used to illustrate how an operating system implements an application schedule that includes an embodiment of the present invention.

Figure 3:
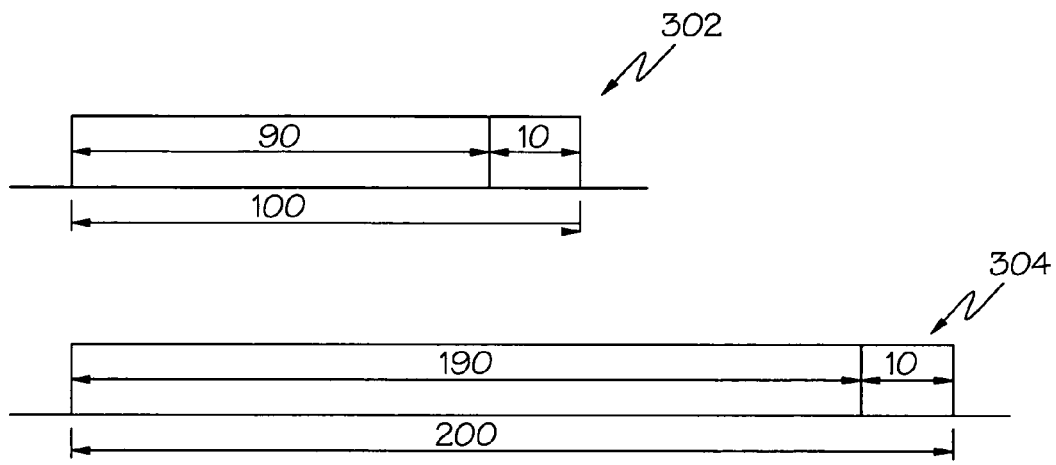
FIG. 3 is a diagram illustrating the activation time budgets of the application threads for an exemplary two thread application.

Referring first to FIG. 3, which shows the time budgets for each of the exemplary application threads used to describe the above-noted process, it is seen that the exemplary application 300 includes only two threads, a first application thread 302, and a second application thread 304. In this example, the first application thread 302 has an activation time budget of 100 units, and the second 304 application thread has activation time budget of 200 units. For ease of explanation, both the first 302 and second 304 threads execute during the same base period. As is shown, the activation time budgets for each of the application threads 302, 304 include a pad time of 10 units. As was noted above, for clarity, the above-mentioned context switch-in time 202 is not illustrated in FIG. 3.

Figure 4:
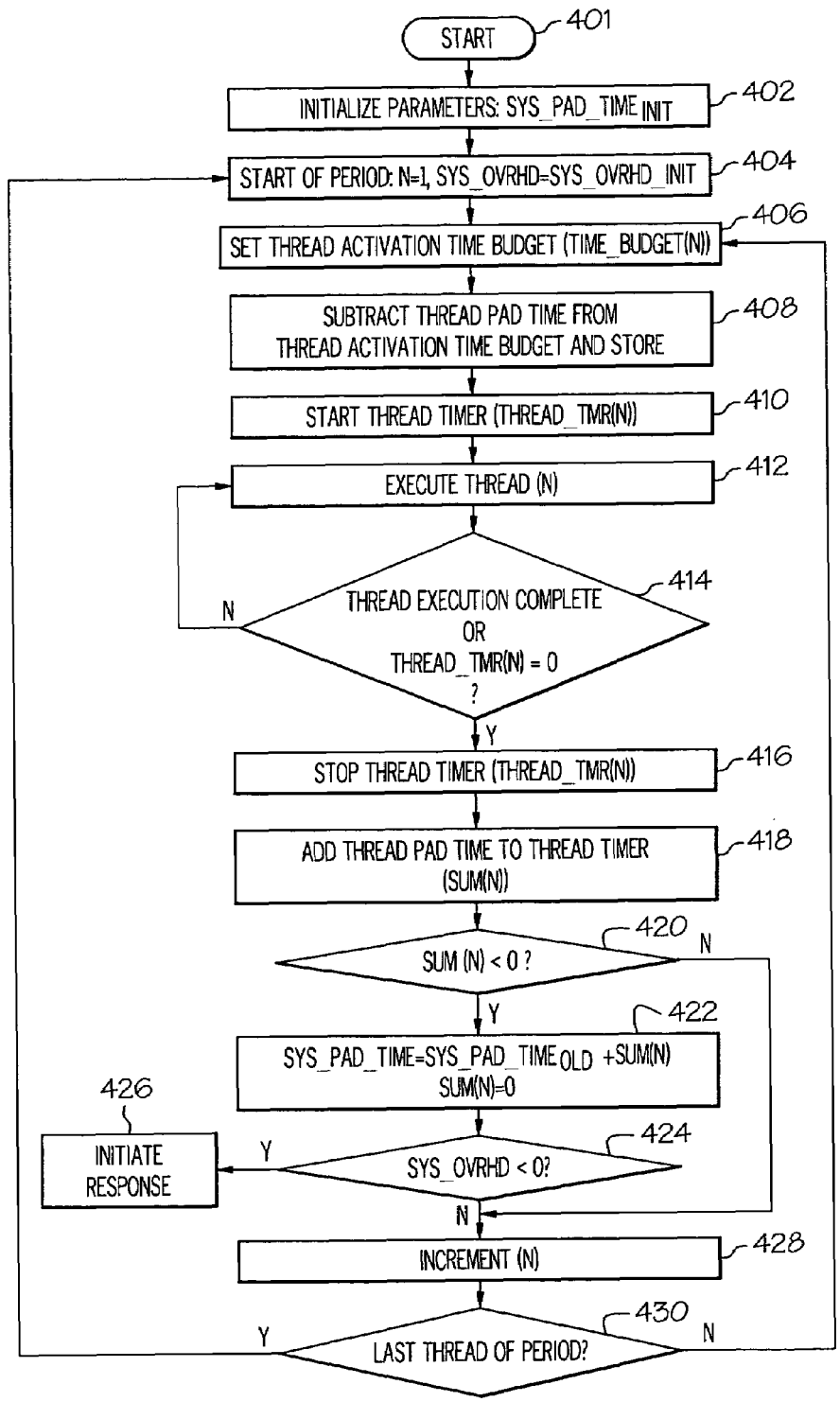
FIG. 4 depicts a flowchart showing an exemplary application thread scheduling process that may implement the present invention.

An exemplary embodiment of a scheduling process 400, which is implemented by the operating system to multiplex processor access time for each of the application threads 302, 304, is shown in FIG. 4, and will now be described in conjunction with the timing diagram shown in FIG. 5. It should be understood that the parenthetical references in the following description correspond to the reference numerals associated with the flowchart blocks shown in FIG. 4.

When the application schedule process 400 begins, it initializes various parameters (402). Included among these parameters is the system pad time value (SYS_PAD_TIME). It will be appreciated that the process 400 could be implemented with more or less variables than what is explicitly shown and described herein. However, for clarity and ease of explanation of the present embodiment, only these two parameters are shown and described.

No matter the particular number of variables to be initialized, in the present embodiment, the system pad time value (SYS_PAD_TIME) is set to an initial value (SYS_PAD_TIME$_{init}$). This initial time value is set aside for the above-described system "pad time," and is subtracted from the overall system time budget. It will be appreciated that the initial value to which this parameter is set may vary, and may be determined in any one of numerous ways. For example, the initial value may be a fixed number that is predetermined and input by system designers, it may be a fixed or variable value that is determined and input by system users, or it may be a variable value is recomputed at each period or some other time frame, just to name a few non-limiting examples. In a particular preferred embodiment, the system pad time value (SYS_PAD_TIME) is initially set to a predetermined initial value (SYS_PAD_TIME$_{init}$) by, for example, a system integrator, and its particular value is preferably determined based on empirical data. No matter the particular value or manner to which it is set, this particular amount of time, as will be described more fully below, is available to the application during each period. For the example shown in FIG. 5, the system pad time value (SYS_PAD_TIME$_{init}$) is set to a value of 30 units.

After the system pad time value is initialized, the period is commenced (404). At this point, the active thread number (N) is set to "1," which corresponds to the first thread to execute during the period. Thereafter, the activation time budget (TIME_BUDGET(N)) for the active thread (N) is set (406). The value to which the activation time budget (TIME_BUDGET(N)) is set is the active thread's entire activation time budget. As was noted above, the active thread (e.g., N=1) is the first application thread 302. Hence, the activation time budget for the first thread 302 (TIME_BUDGET(1)) is set to 100 units.

Before the active thread (N) actually executes, the operating system subtracts the active thread's pad time value from its activation budget and stores the subtracted pad time value in memory (408). An application thread timer (THREAD_TMR(N)) for the active thread (N) is then set to the time that remains after the pad time is subtracted from the active thread budget. The thread timer for each application thread 302, 304, which may be implemented in hardware, software, or firmware, is preferably a decrementing type of timer that may decrement below zero. Hence, in the present example, in which the first thread 302 is the active thread (e.g., N=1), a value of 90 units is stored in memory, and the thread timer (THREAD_TMR(1)) is set to 90 units. Thereafter, at time t=0 in FIG. 5, the thread timer for the first application thread ((THREAD_TMR(1)) begins decrementing (410), and the first application thread 302 begins executing (412). It will be appreciated that the thread timers (THREAD_TMR(N)) could also be implemented as incrementing type of timers.

Once the active thread (N) begins executing (412), it continues doing so until its execution is complete or its thread timer (THREAD_TMR(N)) reaches zero (414). It will be appreciated that the process 400 could include additional and/or other events that would terminate, at least momentarily, the execution of the active thread (N). However, these additional or other events are not needed to understand the present invention and will, therefore, not be further discussed. In either case, once thread execution stops, its thread timer (THREAD_TMR(N)) continues decrementing until the operating system is ready to make the next thread the active thread (418). In the context of the present example, and as shown in FIG. 5, the first application thread 302 does not complete its execution within the expected time, and its thread timer (THREAD_TMR(1)) reaches zero at time t=90. However, for the reasons previously delineated, the operating system is not ready to make the second thread 304 active until time t=110. At that point in time, the first thread's thread timer (THREAD_TMR(1)) is stopped. As can be seen, the first application thread 302 exceeded its budgeted activation time (e.g., 100 units) by 10 units.

After the thread timer (THREAD_TMR(N)) of the active thread (THREAD(N)) stops (416), the active application thread's pad time value 206 is retrieved from memory and is added back to the time remaining on the active thread's thread timer (418). This resultant sum (SUM(N)) is then checked to determine whether it is negative (420). If it is negative, this indicates that the actual activation time of the active thread (THREAD (N)) exceeded its activation time budget and the resultant sum (SUM(N)) value is added to the system pad time value (SYS_PAD_TIME), and the resultant sum is then re-zeroed (SUM(N)=0) (422). Adding this negative sum value (SUM(N)) to the system pad time value (SYS_PAD_TIME) decrements the "system pad time." Conversely, if the resultant sum (SUM(N)) is non-negative, this indicates that the actual activation time of the active thread (THREAD(N)) was within its activation time budget, and no adjustment to the system pad time value is needed. In the context of the present example, and as shown in FIG. 5, at time t=110, the pad time of the first application thread 302 (e.g., 10 units) is added back to the active thread timer (THREAD_TMR(1)). In this instance, the active thread timer (THREAD_TMR(1)) decremented to a value of –20 units. Thus, the resultant sum (SUM(1)) is a negative value of –10 units, and the system pad time value is adjusted to a value of 20 units. Therefore, 20 units of system pad time remain in the system "pad pool" for the second application thread 304 to draw from, if needed, during the present base period.

Once the determination of whether an adjustment to the system pad time value (SYS_PAD_TIME) is needed (420) and, if so, the adjustment is made (422), the system pad time value is checked to determine whether it is negative or non-negative (424). If the value is negative, an appropriate system response such as, for example, a fatal system error, will be executed (426). However, if the value is non-negative, no further action is taken. Instead, the active thread number (N) is incremented (428), and the operating system determines whether the thread that just executed is the last thread of the given period (430). If thread that just executed is not the last thread of the period, the operating system executes a context switch-in to the next active thread (N). Thereafter, process steps (406-428) are repeated. However, if the thread that just executed is the last one for the present period, then a new period is started, and process steps (404-428) are repeated. For the present example, the adjusted system pad time value (SYS_PAD_TIME) is non-negative (e.g., 20 units). Thus, the active thread number (N) is incremented to "2," making the second application thread 304 the active thread, and the previously described steps (406-428) are executed.

As a result, the second application thread's activation time budget (TIME_BUDGET(2)) is set to 200 units (406), and its pad time (e.g., 10 units) is subtracted from its activation time budget, and is stored in memory (408). Then, at approximately time t=110 in FIG. 5, the second application thread's thread timer begins to decrement (410), and the second application thread 304 begins executing (412). It will be appreciated that the second application thread 304 may begin executing slightly later than t=110, due to the time it takes to read, write, and store various data, and also due to the context switch-in time, described above.

Figure 5:
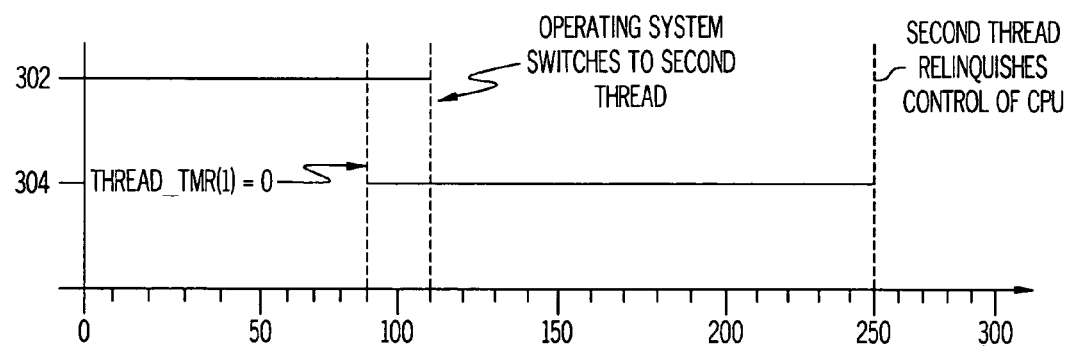
FIG. 5 is a timing diagram depicting the scheduling of the application threads shown in FIG. 3, in accordance with the exemplary process shown in FIG. 4.

It is seen in FIG. 5 that the second application thread 304 continues executing until time t=250, at which point its execution is complete (414). In addition, the operating system is ready to make the next thread active. Thus, the second thread's thread timer THREAD_TMR(2)) is stopped (416) with a value of 40 units remaining on the timer, and the pad time of the second application thread 304 (e.g., 10 units) is added back to the active thread timer (THREAD_TMR(2)) (418). In this instance, the resultant sum (SUM(2)) is non-negative (e.g., 50 units) (420). Because the resultant sum (SUM(2)) is non-negative (420), no adjustment is made to the system pad time value (SYS_PAD_TIME). Since both application threads 302, 304 have executed in the period (428), the process illustrated in FIGS. 4 and 5 repeats for the exemplary application.

It is noted that the example described above and illustrated in FIG. 5 did not result in the system overhead value (SYS_OVRHD) being adjusted to a negative value. However, as was described above and as is shown in FIG. 4, if the system pad time value (SYS_PAD_TIME) is adjusted to a negative value during a period, an appropriate system response such as, for example, a fatal system error, will be executed (426). This may result in the system, or at least a portion of the system, being halted. Depending on the system, it may also result in some type of external annunciation to make operational personnel aware of the error. Moreover, if the affected process is being run on a multi-channel, redundant system, operation may switch to one of the redundant channels within the system.

In the above-described exemplary process 400, the thread timers are decremented, and the thread level pad time that is subtracted from a thread's activation time budget is added back to the thread timer upon completion of the active thread's execution. It will be appreciated that this methodology is merely exemplary of a particular preferred embodiment and that the thread timers, as was previously mentioned, could increment while the associated threads are executing, and the pad time could be subtracted from the timer upon completion of the active thread's execution.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of apportioning additional thread activation time to at least one application comprising at least two computer application threads that experience activation time budget overruns in a system where the at least one application monitors and controls functions, the method comprising:
setting a variable to a system pad time value predetermined before execution of the application;
during the execution of the at least two computer application threads of the at least one application,
activating a first application thread for a first actual activation time,
comparing the first actual activation time with a first activation time budget predetermined before execution of the application,
if the first actual activation time exceeds the first activation time budget, adjusting the system pad time value to thereby obtain an updated pad time value,
activating a second application thread for a second actual activation time,
comparing the second actual activation time with a second activation time budget predetermined before execution of the application, and
if the second actual activation time exceeds the second activation time budget, adjusting the system pad time value to thereby obtain the updated pad time value;
setting the variable to the undated pad time value; and
resetting the variable to the predetermined system pad time value at a predetermined periodicity.

2. The method of claim 1, wherein the first activation time budget comprises a first-activation-budget-pad time.

3. The method of claim 2, further comprising:
initiating a predetermined response if the updated pad time value is adjusted to a predetermined response initiation value.

4. The method of claim 3, wherein the predetermined response initiation value is a value less than zero.

5. The method of claim 2, wherein the first-activation-budget-pad time includes at least time to conduct an application thread context switch-out.

6. The method of claim 5, wherein the predetermined periodicity is each time the application is executed.

7. The method of claim 1, wherein the first activation time budget comprises:
a first thread execution time; and
a first thread pad time.

8. The method of claim 7, further comprising:
subtracting the first thread pad time from the first activation time budget to obtain a first initial thread timer value;
initializing a first thread timer to the first initial thread timer value; and
enabling the first thread timer upon activation of the first application thread.

9. The method of claim 8, further comprising:
disabling the first thread timer upon completion of the first actual activation time to thereby obtain a first final thread timer value; and
adding the first thread pad time to the first final thread timer value to determine a first activation time difference value between the first actual activation time and the first activation time budget.

10. The method of claim 9, wherein the first thread timer is operable to decrement from the first initial thread timer value to the first final thread timer value.

11. The method of claim 9, further comprising:
determining whether the first activation time difference value is positive or negative; and
if the first activation time difference is negative, adding the first activation time difference value to the system pad time value to obtain an updated pad time value.

12. The method of claim 11, further comprising:
determining whether the updated pad time value is positive or negative; and
if the updated pad time value is negative, initiating a predetermined response.

13. A system for apportioning additional thread activation time to at least two application threads of an application that experiences activation time budget overruns while executing on a computer, comprising:

a memory adapted to store at least a system pad time value therein, wherein the system pad time value is predetermined before execution of the application; and a processor in operable communication with the memory and operable to:
  (i) activate a first application thread for a first actual activation time,
  (ii) compare the first actual activation time of the first application thread with a first activation time budget, wherein the first activation time budget is predetermined before execution of the application,
  (iii) if the first actual thread activation time exceeds the first activation time budget, adjust the system pad time value to obtain an updated pad time value,
  (iv) activate a second application thread for a second actual activation time,
  (v) compare the second actual activation time of the second application thread with a second activation time budget, wherein the second activation time budget is predetermined before execution of the application, and
  (vi) if the second actual activation time exceeds the second activation time budget, adjust the system pad time value to obtain the updated pad time value,
  (vii) store the updated pad time value in the memory, and
  (viii) initiate a predetermined response if the updated pad time value is adjusted to a predetermined response initiation value less than zero.

14. The system of claim 13, wherein the first activation time budget comprises a first-activation-budget-pad time.

15. The system of claim 14, wherein the first-activation-budget-pad time includes at least time to conduct an application thread context switch-out.

16. The system of claim 13, wherein the system pad time value predetermined before execution of the application is determined by a system integrator.

17. The system of claim 13, wherein the processor is further operable to reset the variable to the predetermined system pad time value at a predetermined periodicity.

18. The method of claim 17, wherein the predetermined periodicity is each time the application is executed.

19. The system of claim 13, wherein the first activation time budget comprises:
  a first thread execution time; and
  a first thread pad time.

20. The system of claim 19, further comprising:
  a first thread timer in communication with the processor and operable, in response to an enable signal from the processor, to determine the first actual activation time, wherein the processor is further operable to:
    subtract the first thread pad time from the first activation time budget to obtain a first initial thread timer value,
    initialize the first thread timer to the first initial thread timer value, and
    supply the enable signal to the first thread timer upon activation of the first application thread.

21. The system of claim 20, wherein the processor is further operable to:
  supply a disable signal to the first thread timer upon completion of the first actual activation time to thereby stop the first thread timer and obtain a first final thread timer value; and
  add the first thread pad time to the first final thread timer value to determine a first activation time difference value between the first actual activation time and the first activation time budget.

22. The system of claim 18, wherein the first thread timer is operable to decrement from the first initial thread timer value to the first final thread timer value.

23. The system of claim 18, wherein the processor is further operable to:
  determine whether the first activation time difference value is positive or negative; and
  if the first activation time difference is negative, add the first activation time difference value to the system pad time value to obtain an updated pad time value.

24. The system of claim 23, wherein the processor is further operable to:
  determine whether the updated pad time value is positive or negative; and
  if the updated pad time value is negative, initiate a predetermined response.

25. A computer readable medium containing computer executable code for instructing a computer that executes at least one application comprising at least two computer application threads, which is configured to apportion additional thread activation time to the at least two computer application threads that experience activation time budget overruns, to perform the steps of:
  setting a variable to a system pad time value, wherein the system pad time value is predetermined before execution of the at least one application;
  activating a first application thread for a first actual activation time;
  comparing the first actual activation time with a first activation time budget, wherein the first activation time budget is predetermined before execution of the at least one application;
  if the first actual activation time exceeds the first activation time budget, adjusting the system pad time value to thereby obtain an updated pad time value;
  activating a second application thread for a second actual activation time;
  comparing the second actual activation time with a second activation time budget, wherein the second activation time budget is predetermined before execution of the at least one application;
  if the second actual activation time exceeds the second activation time budget, adjusting the system pad time value to thereby obtain the updated pad time value;
  setting the variable to the updated pad time value; and
  initiating a predetermined response if the updated pad time value is adjusted to a predetermined response initiation value less than zero.

26. The computer readable medium of claim 25, wherein the first activation time budget comprises a first-activation-budget-pad time.

27. The computer readable medium of claim 26, wherein the first-activation-budget-pad time includes at least time to conduct an application thread context switch-out.

28. The computer readable medium of claim 25, containing computer executable code for instructing a computer to perform the further steps of: system pad time value predetermined before execution of the application is determined by a system integrator.

29. The computer readable medium of claim 25, containing computer executable code for instructing a computer to perform the further steps of:
  resetting the variable to the predetermined system pad time value at a predetermined periodicity.

30. The computer readable medium of claim 29, wherein the predetermined periodicity is each time the application is executed.

31. The computer readable medium of claim 25, wherein the first activation time budget comprises:
  a first thread execution time; and
  a first thread pad time.

32. The computer readable medium of claim 31, containing computer executable code for instructing a computer to perform the further steps of:
  subtracting the first thread pad time from the first activation time budget to obtain a first initial thread timer value;
  initializing a first thread timer to the first initial thread timer value; and
  enabling the first thread timer upon activation of the first application thread.

33. The computer readable medium of claim 32, containing computer executable code for instructing a computer to perform the further steps of:
  disabling the first thread timer upon completion of the first actual activation time to thereby obtain a first final thread timer value; and
  adding the first thread pad time to the first final thread timer value to determine a first activation time difference value between the first actual activation time and the first activation time budget.

34. The computer readable medium of claim 33, wherein the first thread timer is operable to decrement from the first initial thread timer value to the first final thread timer value.

35. The computer readable medium of claim 33, containing computer executable code for instructing a computer to perform the further steps of:
  determining whether the first activation time difference value is positive or negative; and
  if the first activation time difference value is negative, adding the first activation time difference value to the system pad time value to obtain an updated pad time value.

36. The computer readable medium of claim 35, containing computer executable code for instructing a computer to perform the further steps of:
  determining whether the updated pad time value is positive or negative; and
  if the updated pad time value is negative, initiating a predetermined response.

37. An aircraft avionics device, comprising:
  a central processing unit (CPU);
  memory;
  at least one application that experiences activation time budget overruns while executing on the CPU and using the memory, the at least one application comprising:
  at least two computer application threads;
  setting means for setting a variable to a predetermined system pad time value;
  thread activation means for activating a first computer application thread of the at least one application for a first actual activation time and for activating a second computer application thread of the at least one application for a second actual activation time;
  activation time determination means, in operable communication with the thread activation means, for determining the first actual application time of the first application thread and for determining the second actual application time of the second application thread;
  comparison means, in operable communication with the activation time determination means, for comparing the first actual application time of the first application thread with a first activation time budget and for comparing the second actual application time of the second application thread with a second activation time budget;
  adjustment means, in operable communication with the comparison means, for adjusting the system pad time value to thereby obtain an updated pad time value if either the first actual thread activation time exceeds the first activation time budget or the second actual thread activation time exceeds the second activation time budget;
  updating means for updating the variable to the undated pad time value; and
  resetting means for resetting the variable to the predetermined system pad time value at a predetermined periodicity.

\* \* \* \* \*